Patented Jan. 17, 1928.

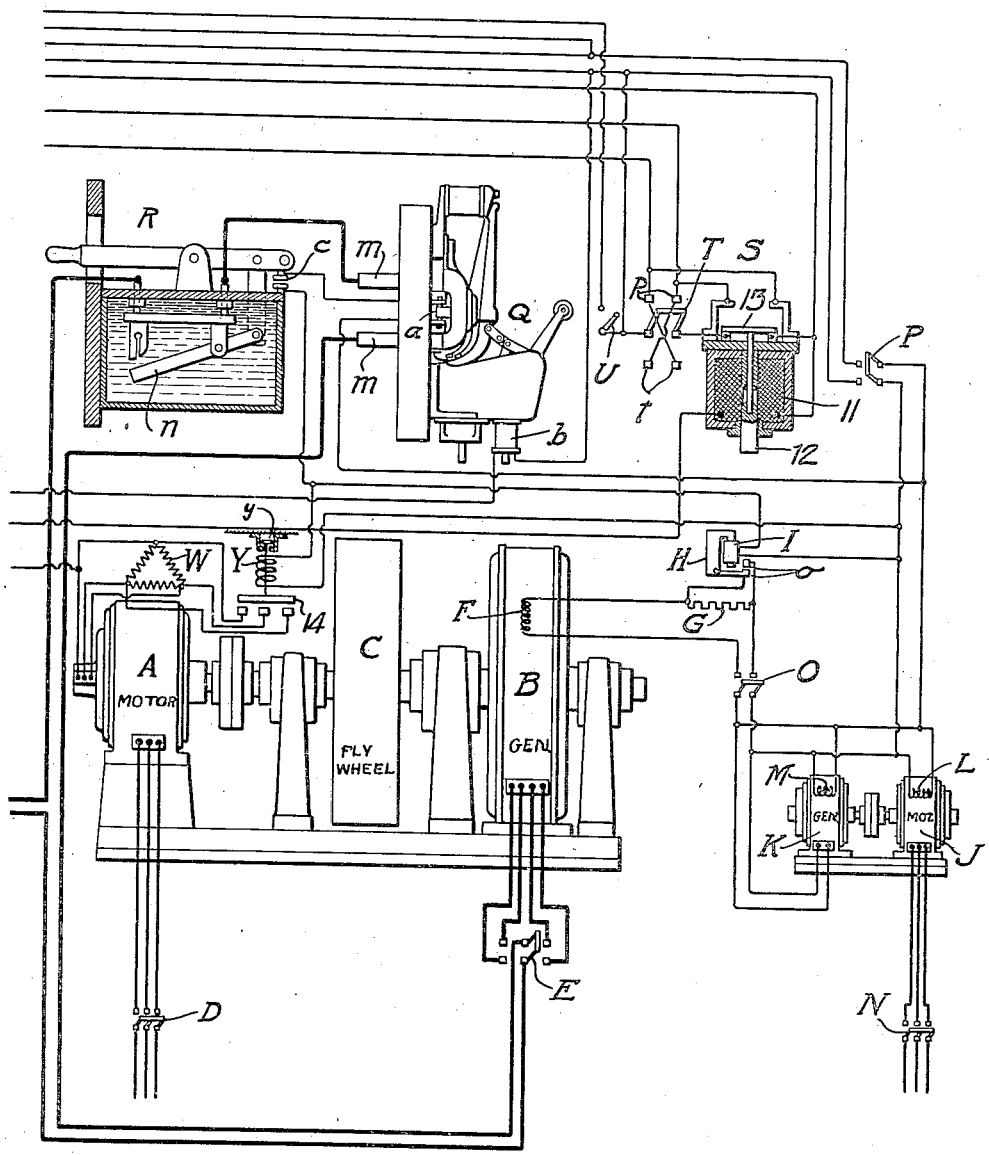

1,656,274

UNITED STATES PATENT OFFICE.

HENRY S. HOLMES, OF NEW YORK, N. Y., ASSIGNOR TO THOMAS E. MURRAY, OF BROOKLYN, NEW YORK.

ELECTRIC WELDING APPARATUS.

Application filed February 9, 1925. Serial No. 7,772.

In my pending application No. 689,878, I have described a method and apparatus for performing a succession of electric welding operations in which a heavy current is applied for a short time from the secondary winding of a transformer, the primary winding of which is connected to an alternating current generator of insufficient capacity to carry such a heavy current continuously and, between welding operations, storing energy by a fly-wheel or equivalent device driven by a motor adapted to consume from the power supply at any instant only a fraction of the energy demanded by the welding machine. The present invention provides a modification of the apparatus for generating and controlling the current in such a case.

The accompanying drawings illustrate an embodiment of the invention, the single figure being a diagrammatic elevation, partly in section, of the generating and controlling apparatus. The circuit carrying the primary welding current is indicated by heavy lines and the control circuits by light lines.

A is the motor of the fly-wheel motor-generator set; B is the generator and C is the fly-wheel. The switch D controls the current for running the motor, while the double throw switch E permits either phase of the two phase generator to be connected to the welding machine.

The revolving field F, shown diagrammatically, is actually connected to a direct current source through the usual slip rings. A resistance G is in series with the field, said resistance being short circuited by the contactor H, when the solenoid I is energized. The exciter set consists of the synchronous motor J and the direct current generator K. The field of the motor is shown at L; that of the generator at M. The switch N controls the motor input; the switch O the field current for the fly-wheel generator; and the switch P the direct current for the control and pressure apparatus. The usual starting rheostats for the motors, the field rheostat for the generator, the circuit-breakers, indicating instruments, etc., have been omitted from the drawing for the sake of simplicity. Q is the air breaker in the welding circuit upon which is mounted an auxiliary contactor $a$ which is closed when the breaker is closed and open when the breaker is open. This breaker is closed manually and opened by the solenoid $b$.

R is an oil switch in the welding circuit upon which is mounted the auxiliary switch $c$ which is closed when the oil switch is closed and open when the oil switch is open. The oil switch is both closed and opened manually.

The circuit breaker as shown is closed by hand, and the oil switch is both closed and opened by hand. Of course, if it were desired to place these switches at some distance from the welding machine, they could be adapted for operation by any of the well known means of remote control, such as solenoid, motor or air.

A limit switch is designated as a whole by the letter S. There are various types of limit switch, manual or automatic, which may be used. T is the motor control switch and U is the pressure control switch.

The method of operation is as follows. The switch D is first closed and the fly-wheel motor-generator set brought up to speed in the usual manner. The switch N is closed, starting the exciter set. After the generator K of this set has been brought up to the proper voltage, the switch O is closed, thus exciting the generator B. It will be noted, however, that there is a resistance G in this circuit so that the potential impressed on the field of the generator B is only a fraction of the voltage delivered by the exciter generator K. Both the exciter generator K and the fly-wheel generator B are now ready to deliver energy.

The parts to be welded are brought into contact and pressed together as follows. The direct current supply switch P is closed and may remain closed continuously. The motor control switch T is then swung downwardly to close the circuit between the two contacts $t$, $t$. At the end of the operation the machine is adapted to make contacts which close the circuits through the solenoid 11 of the limit switch S so as to draw up the plunger 12 and to lift the strap 13 at its upper end out of engagement with the lower pair of contacts and into engagement with the upper pair of contacts, thus breaking the motor circuit through the contacts $t$, $t$; and an instant later closing the circuit through the contacts $p$, $p$, which shorts circuits the motor of the apparatus and causes it to stop. The motor control switch T is then opened, allowing the strap 13 to fall back against the lower pair of contacts. Separate electro-magnets are provided on the machine for pressing the welding electrodes toward each other during the passage of the welding current. This pressure is effected by closing the switch U, which establishes a direct current through the coils of the electro-magnets.

To start the weld then, the alternating current supply switch E is first closed in either direction. The switch Q, the contacts of which are in air, is closed, and then the switch R, the contacts of which are in oil. The advantages of an air and oil switch have been described in Murray Patent No. 1,320,896 of November 4, 1919. Closing said switch allows alternating current to flow through the main contacts $m$ of the switch Q and the main contact $n$ of the switch R to the welding transformer, and at the same instant allows direct current to flow through the auxiliary contacts $a$ and $c$, thus energizing the solenoid I and closing the contacts $o$, thus short circuiting the resistance G in series with the generator field the instant that the weld starts.

Current now flows through the work and the parts are moved together to a predetermined point. Thereupon contacts are engaged on the machine which close the circuit through the trip coil $b$ on the switch Q, thus opening said switch and interrupting the welding current. Simultaneous with the opening of switch Q is the opening of the contact $a$, thus de-energizing the coil I and allowing the contacts $o$ to fall open. The above method of interrupting the welding current is described in Holmes Patent No. 1,220,848 of March 27, 1917.

The weld being now accomplished, and the pressure switch U opened, the motor control switch T is swung upwardly to close the circuit with the two contacts $p$—$p$. This will cause a restoration of the parts of the machine to their former position, after which the switch T is opened ready for a new operation.

After the welded work has been removed, the oil switch R is opened and a new pair of objects to be welded are inserted in place between the electrodes and the cycle of operations repeated.

Particular attention is called to the contacts $a$ and $c$ and to the effect of closing said contacts, also to the switch H which in turn closes the contacts $o$, thus short circuiting the resistance G and thereby allowing the full potential of the exciter generator K to be impressed on the field F the instant that the weld starts. This holds the voltage of the generator B to the desired value, and permits the use of a generator of smaller capacity than would otherwise be possible.

The motors A and J and the generators B and K may be of any type known to the profession as adapted to this particular work. A two-phase generator has been illustrated, but a single phase, three-phase or other suitable type of alternating current generator can be used, the switch E being changed accordingly as will be understood by those skilled in the art.

Instead of the particular controlling apparatus shown, apparatus of various other usual or suitable designs may be substituted. For example, the duration of the welding current may be controlled in the manner described in Woodrow Patent No. 1,230,357 of June 19, 1917 or in that described in the Heany Patent No. 1,050,827 of January 21, 1913, or Heany Patent No. 1,078,675 of November 18, 1913 or by other automatic means.

It is not necessary to use direct current for the pressure magnets or for any of the controlling apparatus. Alternating current may be used instead. Direct current, however, must be used in the field of the generator and may be obtained from a motor generator set as shown in the drawing, or from a direct connected or belt driven exciter, or from any other suitable source.

During the welding operation the voltage may fall off, may remain practically constant or may increase. The curve which it follows will depend on a variety of factors, such as the difference in field current between no load and full load and the size of the generator load. In practice the voltage may vary up or down and the current and the power factor may also vary, but the ultimate amount of energy delivered by the generator to the welding machine is greater when the field current is increased than if it remained constant at its original strength.

Not only does the invention permit the use of a small generator, as explained above; but it permits also the use of a motor for driving the fly-wheel or other storage device, the characteristics of which motor are such that it can consume from the power source or main electric system at any instant only a fraction of the energy demanded by the welding machine.

The motor generator set may be used for generating the welding current for a plurality of machines, being connected to the different machines in succession. For instance, suppose there are two welding machines to be operated from the motor generator set. Each machine will weld once every minute. The generator, then, must supply 2400 kv. a. for four seconds every 30 seconds. In other words, the generator supplies 2400 × 4 kv. a. seconds or 9600 kv. a. seconds. The motor has 26 seconds to bring the flywheel back to speed and to store up energy for the next weld. This means, neglecting losses, that the motor will take from the electric system an average of 9600 kv. a. seconds divided by 26 seconds, or 370 kv. a. for 26 seconds. As a matter of fact the motor will take about twice this kv. a. at the instant of welding and taper off to less than half that at the end of 26 seconds. By using a motor of the proper type and with the proper characteristics it is possible to limit the inrush to say 700 kv. a. or to even a smaller value if advisable.

In certain cases where the capacity of the electric system is particularly limited, it is desirable to keep the inrush to the motor at the instant of welding within the full load rating of the motor, in this case 400 h. p. I accomplish this by automatically inserting in the secondary circuit—that is the rotor—of the motor, a resistance. This insertion takes place the instant the weld starts and the short circuiting of this resistance occurs either at the instant the weld is stopped, or at a predetermined time thereafter. By choosing the proper value for the resistance the inrush may be limited to any predetermined value. Of course, the current consumed by the motor will not taper off as before, and the time necessary to bring the fly-wheel back to speed will be slightly longer.

The rotor or secondary of the induction motor A is of the "wound" type. It is connected through slip rings to the resistances W. These resistances are short circuited by the contact bar 14 of the contactor when the solenoid Y is not energized.

The solenoid Y is connected in parallel with the solenoid I of the contactor H. Thus the solenoid Y will be energized by means of the contact $a$ when the oil switch R is closed. When said solenoid is energized the contacts 14 will open and the resistances W will be introduced into the secondary circuit of the motor. When the circuit breaker Q is opened and the weld is completed the solenoid Y will be de-energized by the opening of contact $a$ on circuit breaker Q. The contact bar 14 will close and short circuit the resistances W. A dash pot $y$ or other time lag device connected to the armature of the contactor will prevent the closing of the contacts 14 until a predetermined time has elapsed after the solenoid Y has been de-energized Though I have described with great particularity of detail a certain apparatus and method of control embodying my invention, yet it is not to be understood therefrom that the invention is restricted to the particular embodiment disclosed. Various modifications may be made by those skilled in the art without departure from the invention as defined in the following claims.

What I claim is:

1. An apparatus for performing a succession of electric welding operations in which a heavy current is applied for a short time, including a circuit for the welding current, a generator for supplying current to said circuit, a motor for driving the generator adapted to consume from the power supply at any instant only a fraction of the energy demanded by the welding machine, and means for limiting an inrush of current to the motor at the instant of welding.

2. An apparatus for performing a succession of electric welding operations in which a heavy current is applied for a short time, including a generator of the welding current for the apparatus, an alternating-current motor for driving the generator adapted to consume from the power supply at any instant only a fraction of the energy demanded by the welding machine, and means for limiting an inrush of current to the motor at the instant of welding, said limiting means comprising devices for automatically inserting resistance in the secondary circuit of the motor.

3. An apparatus for performing a succession of electric welding operations in which a heavy current is applied for a short time, including a generator of the welding current for the apparatus, an alternating-current motor for driving the generator adapted to consume from the power supply at any instant only a fraction of the energy demanded by the welding machine, and means for limiting an inrush of current to the motor at the instant of welding, said limiting means comprising devices for automatically inserting resistance in the secondary circuit of the motor and means for automatically short circuiting this resistance after the weld is stopped.

4. An apparatus for performing a succession of electric welding operations in which a heavy current is applied for a short time, including a generator of the welding current for the apparatus, an alternating-current motor for driving the generator adapted to consume from the power supply at any instant only a fraction of the energy demanded by the welding machine, and means for limiting an inrush of current to the motor at the instant of welding, said limiting means comprising devices for automatically inserting resistance in the secondary circuit of the motor and means for automatically short circuiting this resistance a predetermined time after the weld is stopped.

5. An apparatus for performing a succession of electric welding operations in which a heavy current is applied for a short time, including a circuit for the welding current, a generator for supplying current to said circuit, a motor for driving the generator adapted to consume from the power supply at any instant only a fraction of the energy demanded by the welding machine, a separate circuit for actuating the moving parts of the machine, and means in said separate circuit for limiting an inrush of current to the aforesaid motor at the instant of welding.

In witness whereof, I have hereunto signed my name.

HENRY S. HOLMES.